B. F. GREENOUGH.
Alcohol Still.
No. 10,349.
Patented Dec. 20, 1853.
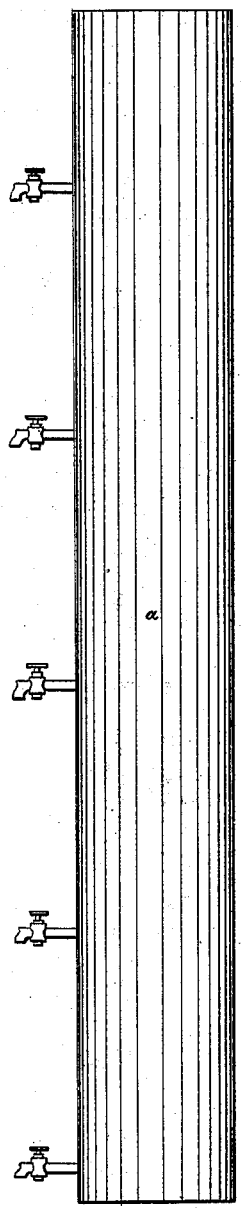

UNITED STATES PATENT OFFICE.

B. F. GREENOUGH, OF CINCINNATI, OHIO.

IMPROVEMENT IN SEPARATING ALCOHOL FROM WATER AND OTHER HEAVIER FLUIDS.

Specification forming part of Letters Patent No. 10,349, dated December 20, 1853.

*To all whom it may concern:*

Be it known that I, B. F. GREENOUGH, of Cincinnati, in the State of Ohio, have discovered a new and useful means of separating alcohol and other fluids and solutions mechanically mixed with aqueous and other fluid particles from each other without distilling or otherwise evaporating by heat, the following being a full, clear, and exact description of the mode or means of executing the same.

By the standard of 1,000, the weight of a cubic inch of water is expressed by the decimal .036166, at the temperature of 32.2° Fahrenheit. Consequently the pressure of a column of water one foot high, having a square inch for its base, would be .4340, and at the depth of ten feet would be as ten to one, and increased in pressure in the following ratio: At the depth of ten feet it would be 4.340 pounds; at the depth of twenty feet it would be 8.680 pounds; at the depth of thirty feet it would be 13.020 pounds; at the depth of forty feet it would be 17.360 pounds; at the depth of fifty feet it would be 21.700 pounds; at the depth of sixty feet it would be 26.040 pounds; at the depth of seventy feet it would be 30.380 pounds; at the depth of eighty feet it would be 34.720 pounds; at the depth of ninety feet it would be 39.060 pounds; at the depth of one hundred feet it would be 43.400 pounds.

By the standard of 1,000 for water at 39.2° Fahrenheit, the specific gravity of absolute alcohol is 792. Therefore, a column of absolute alcohol, having one inch square for its base and one foot in height, the pressure is 3.437, and from ten to one hundred feet would increase in pressure to the square in the following ratio: At the depth of ten feet it would be 3.437; at the depth of twenty feet it would be 6.874; at the depth of thirty feet it would be 10.311; at the depth of forty feet it would be 13.748; at the depth of fifty feet it would be 17.185; at the depth of sixty feet it would be 20.622; at the depth of seventy feet it would be 24.059; at the depth of eighty feet it would be 27.496; at the depth of ninety feet it would be 30.933; at the depth of one hundred feet it would be 34.370.

Proof-spirit, or a mixture of equal parts of water and alcohol, by the standard of 1,000 for water and 972 for absolute alcohol, at the temperature of 39.2° Fahrenheit, has a specific gravity of 896. The pressure of a column of proof-spirit having a base of one inch square and one foot in height would be .3888, and the pressure of the square inch from ten to one hundred feet would increase in the following ratio: At the depth of ten feet, 3.888; at the depth of twenty feet, 7.776; at the depth of thirty feet, 11.664; at the depth of forty feet, 15.552; at the depth of fifty feet, 19.440; at the depth of sixty feet, 23.328; at the depth of seventy feet, 27.216; at the depth of eighty feet, 31.104; at the depth of ninety feet, 34.992; at the depth of one hundred feet, 38.880—the pressure of water at the depth of ten feet being 4.340 pounds, and that of absolute alcohol 3.437 pounds, the difference of pressure being only .903 to the square inch, while at the depth of one hundred feet it is 9.03, being equal to a gain in favor of water as ten to one in point of displacement. Therefore, the mean point of specific gravity between the water and alcohol would be 45.15 feet from the surface of the liquid. This would be the point of equilibrium of a column one hundred feet in height, filled with proof-spirit. Consequently a total displacement would take place at 90.30 feet from the surface of the liquid, at which point it will be seen, by reference to the table, is a pressure to the square inch equal to the specific gravity of alcohol, .3437 at one foot in height, and 34.992 density in pressure at ninety feet in the table relating to proof-spirit. Now, it would follow that if a column of one hundred feet in height of any given diameter be filled with proof-spirit and the liquid kept at rest, except the action that would be caused by the ascending of alcoholic particles, and the descending of water, that at 45.15 feet from the surface of the liquid, if a faucet be inserted just proof-spirit could be drawn off, and from this point down the proof or quantity of alcohol would lessen until it reached the depth of 90.30 feet, below which point water may be drawn entirely divested of every portion of alcohol.

It may be asked how it is that if equal measures of alcohol and water are put into a column the mean density should be at 45.15 feet from the surface.

It will be seen by reference to the foregoing tables that as to the depth of the liquid so does the pressure increase, as nearly ten to one in favor of water, that liquid being to alcohol as 1,000 to 792, or more than one-fifth heavier. It may be offered as another objection to this position that alcohol and water have an affinity or power of concentration, and this principle will in a degree render the process of separation more difficult than the separation of other liquids not so intimately combined; but the law of gravity acting upon liquid, in connection with the hydrostatic laws, render them very absolute and perfect machines, gravity being as subtile a principle as that manifested by the action of caloric in the common process of distillation, both producing power or force by their manifestations, the one through the process of combustion, and the other only in the relative position of matter; or, in a more lucid explanation, take the specific gravities of water and alcohol, it will be seen that the difference is .208, or that alcohol is more than one-fifth lighter than water. Now, if we suppose a globule of alcohol of one-fourth inch in diameter, and place it upon the surface of water, it would float and displace, say, four-fifths of its own bulk of the water; but it has another property not common to solids—that of affinity — and is diffused or placed in its most infinitesimal proportions in and through water, and requires some agent acting for the displacement of these infinitely small particles. Now, if we take as a basis that water, under the law of hydrostatics, displaces relatively one-fifth ($\frac{1}{5}$) the same bulk of alcohol, then at ten feet it would displace two-fifths, and at twenty, three-fifths; at thirty feet, four-fifths, and forty feet a total displacement, but having the law of affinity nearly equal to its difference of specific gravity, therefore we have to employ some counter-opposing force to overcome this tendency; and if we look at the foregoing tables it will be seen that the ratio of pressure or density is in proportion as ten (10) to one in favor of water in point of displacement at one hundred feet depth; but as the specific gravity is only as 972 to 1,000, the extreme point at which the specific gravity of alcohol would find its equilibrium would be at 90.30 feet from the surface, where the pressure of water is equal to the difference between the liquid—as 903 to 1,000—or nearly ninety-seven one-thousandths of alcohol to nine hundred and three one-thousandths water, it will be seen that as the density increases from the surface down, at a given distance—say ten feet—there will be a greater relative proportion of water to the alcohol than there will be of alcohol to water at the depth of eighty feet, in just the proportion as the density decreases under the law of hydrostatics; and in consequence of which, while we find a total displacement of alcohol at 90.30 feet, we shall find water in union with alcohol at two feet from the surface, presenting the phenomenon of two columns of liquid, the one within the other, the height or length of the column of water being about ninety-eight feet, while that of the alcohol will be only 90.30 feet in length; or a column of alcohol floating upon a column of water, with one-fifth its cubical contents above the surface of water, and testing the actual affinity of the alcohol and water by a hydrometric scale under the laws of gravity and hydrostatics.

I have used this device as a mode of separating alcohol from whisky in my experiments for several months. The column was of wrought-iron about one hundred feet. The diameter was about twelve inches, extending from the cellar up through and above the building. The whisky was forced up from the upper room of the building through an iron pipe, leading over the top of the column and down the inside about fifty feet. This sized column will separate about two hundred gallons of alcohol from the water in the space of twelve hours. The larger the diameter the more rapid the process of separation. According to my views, a column of three to four feet diameter will separate about forty barrels of ninety-two per cent. of alcohol in the space of twenty-four hours. This apparatus answers equally well for all kinds of alcoholic mixtures containing water and alcohol, whether it be whisky or rum.

When alcohol is to be extracted from whisky or other liquids containing it, I form a column or tank, $a$, of any given elevation, and provided with suitable taps or cocks, (usually from thirty-three to one hundred feet,) and any diameter—the higher the better—so as to produce a pressure of one, two, or more atmospheres upon the lower portion of the liquid contained therein, the pressure of course gradually diminishing from the bottom to the top, according to the well-known laws of hydrostatics. By filling said column or tank with whisky or other liquor containing alcohol and letting it remain at rest, the alcoholic particles gradually rise to the top with more or less expedition, according to the height of the said column or tank, separating themselves from the aqueous particles with which they are mechanically mixed, so that the alcohol may be drawn off pure, or nearly so, by a faucet near the top, and different proofs at various distances down the column or tank, and water may be drawn from the bottom through another faucet. The alcohol is thus extracted by the law of hydrostatic displacement without the expense of distilling or otherwise heating the compound fluid. It is obvious there are other compound fluids that can be treated in the same way, a particular reference to which is not necessary, and all without the aid of heat, except enough to keep them in a state of fluidity.

Having described my new mode or method of separating alcohol, in solution or mixture, and other liquid compounds from each other, what I claim as my discovery, and wish to secure by Letters Patent, is—

The separating of alcohol and its compounds of parts of different specific gravities by means of the pressure of a column of such liquids, thereby causing what I denominate the "hydrostatic displacement," as herein substantially set forth.

B. F. GREENOUGH.

Witnesses:
   Geo. W. Guysi,
   Jno. R. Guysi.